F. LOVENICH.
CHUCK.
APPLICATION FILED MAY 6, 1907.
917,087.
Patented Apr. 6, 1909.
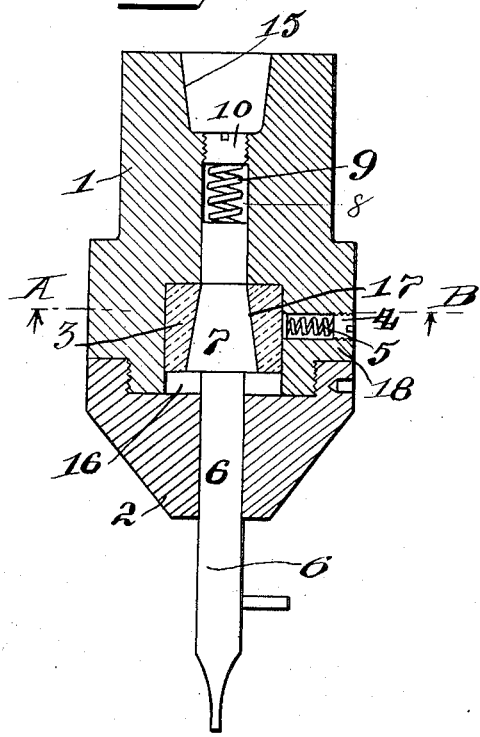
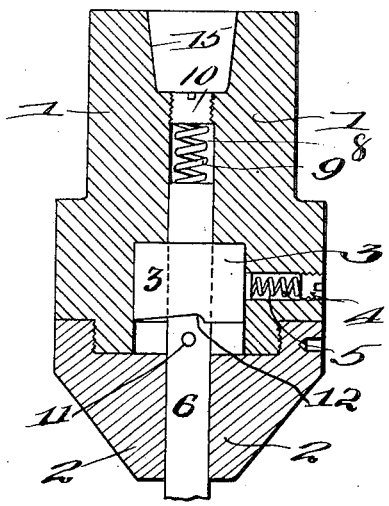
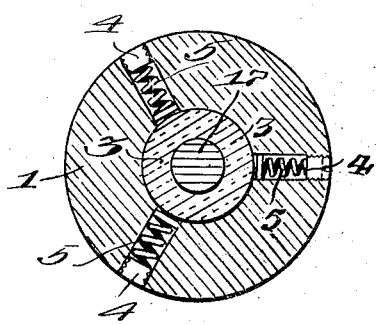
Witnesses:
C. S. Ashley
R. W. Ashley
Inventor
Franz Lovenich
By his Attorneys
Mastick & Jones

UNITED STATES PATENT OFFICE.

FRANZ LÖVENICH, OF FRANKFORT-ON-THE-MAIN, GERMANY.

CHUCK.

No. 917,087.  Specification of Letters Patent.  Patented April 6, 1909.

Application filed May 6, 1907. Serial No. 371,976.

*To all whom it may concern:*

Be it known that I, FRANZ LÖVENICH, a subject of the German Emperor, and a resident of Frankfort-on the-Main, Germany, have invented certain new and useful Improvements in Chucks, of which the following is a specification.

My invention relates to improvements in chucks, and the object of my improvements is to provide a chuck by means of which screwdrivers, wrenches, or similar tools can be mounted on the spindle of a drill press or lathe, whereby screws, nuts or the like can be mechanically fixed. For this purpose the chuck is so constructed as not to rotate the tool mounted thereon permanently, but only while it is moved downward, and while the tool engages the screw, or nut, and the object to which the latter is intended to be fixed. To effect this, a clutch mechanism is provided between the chuck and the tool, which clutch mechanism is normally held open, so that the tool is not coupled to the chuck, and it is closed only while axial thrust is exerted on the tool by engaging the screw or nut, and the object intended to receive the latter.

The invention further consists in providing means to prevent injury to the tool or to the object to be operated on, in case the resistance offered to the rotation of the tool be too great, which will regularly occur when the screw or nut has been fixed. If in such cases the rotation of the tool were continued, either the tool would be injured or the head of the screw, or the nut would break off. To avoid this, the tool has not a positive but a frictional engagement with the chuck.

To illustrate my invention, I have shown in the accompanying drawings, two examples of a chuck provided with the improvements.

In said drawings—Figure 1, is a vertical longitudinal section of an example of the improved chuck, Fig. 2, is a cross-section of Fig. 1, taken on the line A B, Fig. 3, is a longitudinal section similar to Fig. 1, and showing a modification of the chuck.

Similar numerals of reference refer to similar parts throughout the views.

Referring particularly to the example shown in Figs. 1 and 2 of the drawings, it will be seen, that the chuck comprises a body 1 to which an element 2 is screwed or otherwise attached. At its upper end, the body 1 shows a socket 15, by means of which it may be mounted on the spindle or mandrel of a drill press or lathe, as is usual in the art. At its lower portion, the body 1 is provided with a circular, axial socket 16, forming a bearing for a ring 3 having a conical axial bore 17. Said ring is rotatably located within the socket 16, and it is held in position by means of coiled springs 5 arranged in radial holes 18 of the body 1 and abutting against small screws 4. The ring 3 is adapted to receive, in its bore 17, a tool, which, in the example illustrated, is a screw driver 6 having on its shank an enlarged conical part 7 fitting into the bore 17. The screw driver is prevented from falling out of the chuck by the element 2 and the lower shoulder provided by the conical part 7. The upper cylindrical end of the tool 6 extends into an axial hole 8, and abuts against a coiled spring 9 arranged within said hole 8 and held in place by a screw 10 screwed into the upper part of said hole. The spring 9 has the tendency to drive the tool 6 out of engagement with the ring 3, when the chuck is in its retracted or upper position. The rotation of the tool can therefore be stopped at any time, though the chuck be rotating. The rotation of the body 1 is transmitted to the ring 3 by the frictional engagement of the springs 5 with the ring 3, the friction being so regulated by the screws 4, that, as soon as a screw has been fixed by the screw driver 6, and the chuck is not retracted, the ring 3 will slide within the body, whereby rotation of the screw driver is stopped. Thus any excessive strain on the screw, or the breaking off of the screw head, or any injury of the screw driver is avoided. For the screw driver, illustrated as an example, any other tool having a similar function, such as a wrench, may be substituted.

In the modification shown in Fig. 3, the ring 3 is not provided with a conical bore 16 but with a cylindrical bore, the shank of the tool being likewise cylindrical all over its length. On its lower surface, the ring 3 is provided with notches 12 arranged preferably diametrically opposite each other, the shank of the tool having radially projecting studs or pins 11 adapted to be engaged by said notches, as soon as the tool 6 is pushed upward by an axial thrust caused by the engagement of the tool 6 with a screw and the object into which the latter is intended to be driven. By such an engagement of the pins 11 and the notches 12 the tool is coupled to the chuck.

I claim:

1. In a chuck the combination with a body of a ring within said body, springs supported in said body and bearing against the outer periphery of said ring, means for holding said springs against said ring, a tool and means for engaging the tool with the ring.

2. In a chuck the combination with a body of a ring within said body, springs supported in said body and bearing against the outer periphery of said ring, means for adjusting the pressure of the springs against the ring, a tool and means for engaging the tool with the ring.

3. In a chuck the combination with a body of a ring within said body, springs supported in said body and bearing against the outer periphery of said ring and screws seated in said body abutting against the ends of said springs to adjust the frictional engagement of said springs and ring.

4. In a chuck the combination with a body of a ring within said body, springs supported in said body and bearing against the outer periphery of said ring, notches on said ring, a tool and pins on said tool adapted to take into the notches on the ring.

In testimony whereof I have signed my name to this specification in the presence of two subscribing witnesses.

FRANZ LÖVENICH.

Witnesses:
FRANZ HASSLACHER,
ERWIN DEPPELY.